(12) United States Patent
Hsu

(10) Patent No.: US 6,400,059 B1
(45) Date of Patent: Jun. 4, 2002

(54) INNER STATOR OF DRUM TYPE MOTOR

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 9 days.

(21) Appl. No.: 09/712,277

(22) Filed: Nov. 15, 2000

(51) Int. Cl.[7] .............................. H02K 1/12; H02K 1/06
(52) U.S. Cl. ...................... 310/254; 310/68 R; 310/71
(58) Field of Search ................................ 310/254, 216, 310/259, 49 R, 258, 42, 71, 194, 260, 89, 179, 184, 208; 29/596

(56) References Cited

U.S. PATENT DOCUMENTS

| | | | | |
|---|---|---|---|---|
| 1,957,380 A | * | 5/1934 | Barlow ........................ | 310/216 |
| 2,278,139 A | * | 3/1942 | Puchy ......................... | 310/216 |
| 3,158,771 A | * | 11/1964 | Ebegg ......................... | 310/216 |
| 5,187,858 A | * | 2/1993 | Murakoshi et al. ............ | 29/596 |
| 5,212,419 A | * | 5/1993 | Fisher et al. ................ | 310/254 |
| 6,057,621 A | * | 5/2000 | Suzuki et al. ................ | 310/254 |
| 6,072,259 A | * | 6/2000 | Kawabata et al. ........... | 310/216 |
| 6,127,760 A | * | 10/2000 | Nagasaki et al. ............ | 310/254 |
| 6,144,135 A | * | 11/2000 | Ho ............................. | 310/254 |
| 6,211,587 B1 | * | 4/2001 | Enomoto et al. ............. | 310/89 |

* cited by examiner

*Primary Examiner*—Tran Nguyen
(74) *Attorney, Agent, or Firm*—Rosenberg, Klein & Lee

(57) ABSTRACT

An inner stator of a drum type motor is disclosed. In a conventional inner stator punched by silicon steel piece is exploded into an inner stator ring with a plurality of inlaying groove, inner stator teeth and exciting coil wire seats. The wire seat is wound by a respective exciting coil and then is engaged with a stator teeth, which is correspondent to the outer ring of the inner stator ring with respect to the plurality of inner stator ring unit. The guide pin of the wire seat is positioned and combined with the upper and lower exciting coil retaining plate, and the wire head and tail of the coil is welded to the upper and lower retaining plates so as to be serially connected as a complete exciting coil. Therefore, a motor inner stator is formed.

7 Claims, 10 Drawing Sheets

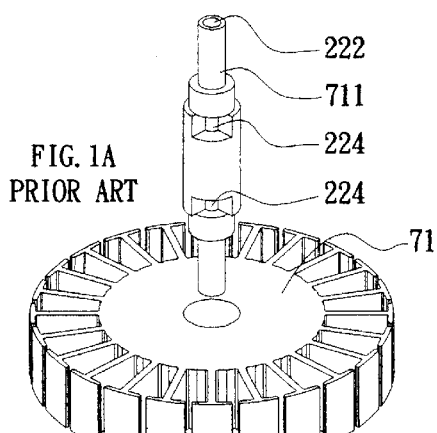
FIG. 1A PRIOR ART
FIG. 1B PRIOR ART
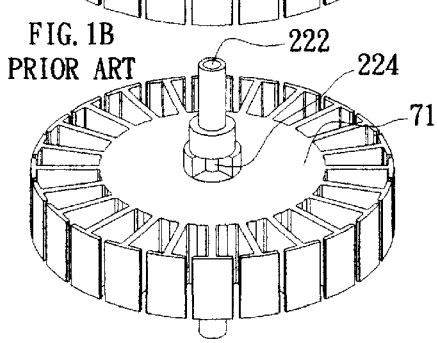
FIG. 1C PRIOR ART
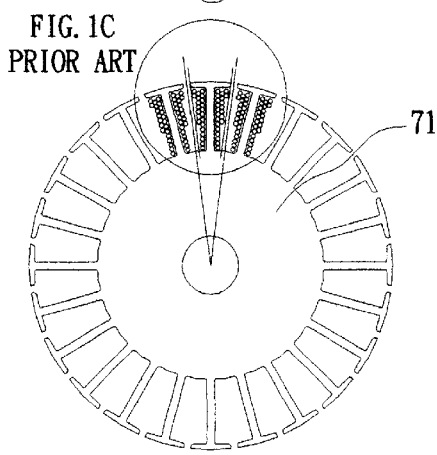
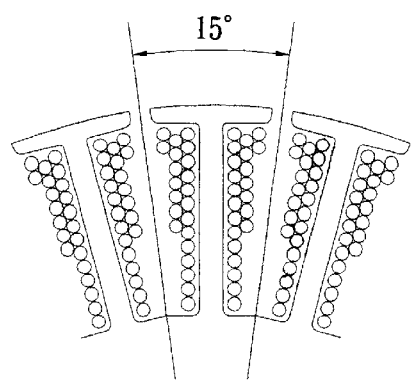
FIG. 1E PRIOR ART
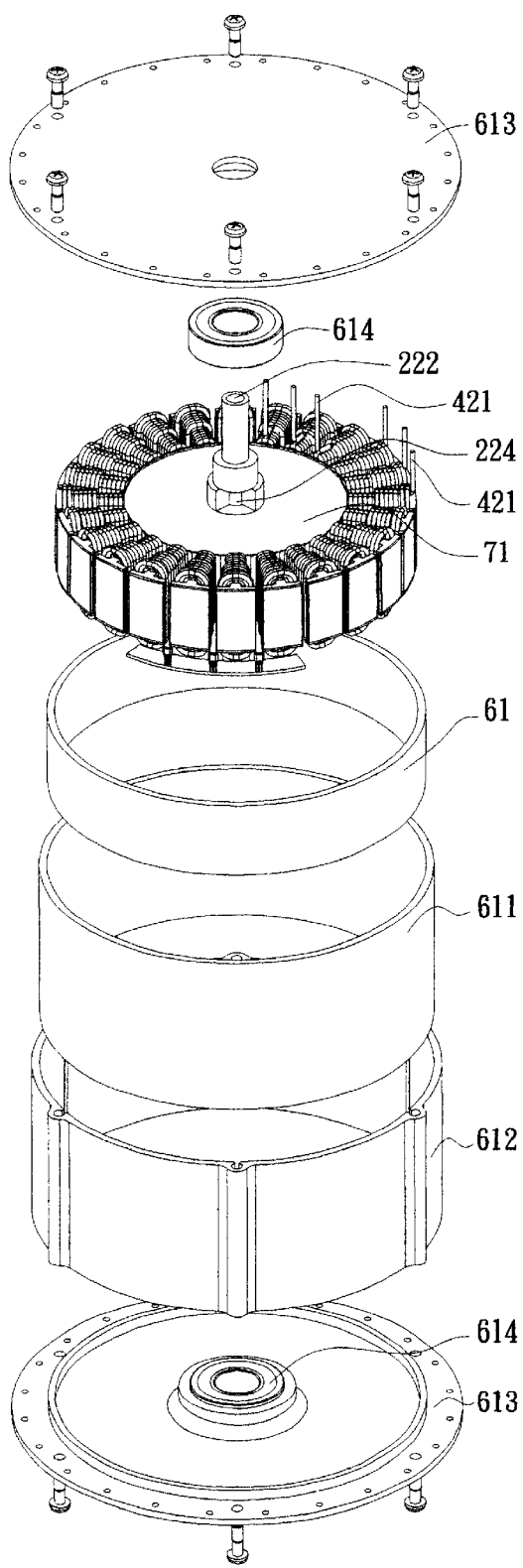
FIG. 1D PRIOR ART

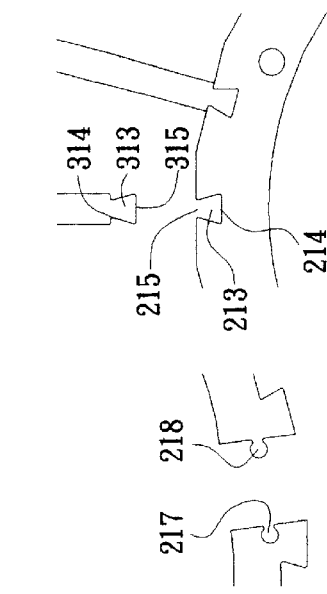
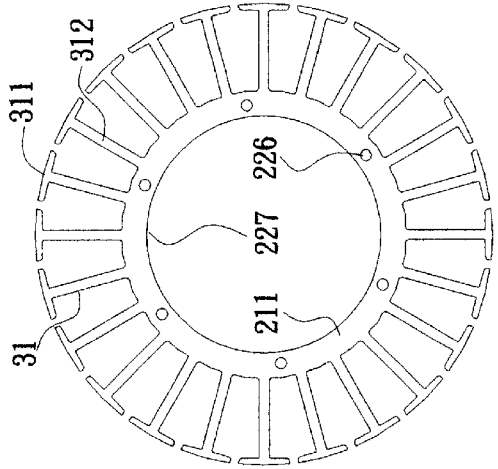
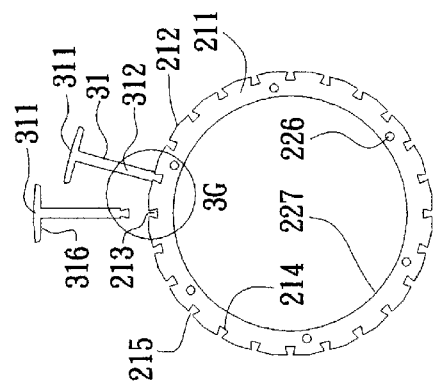
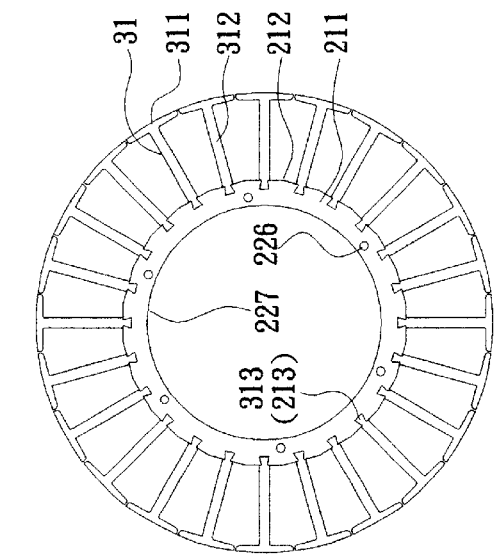
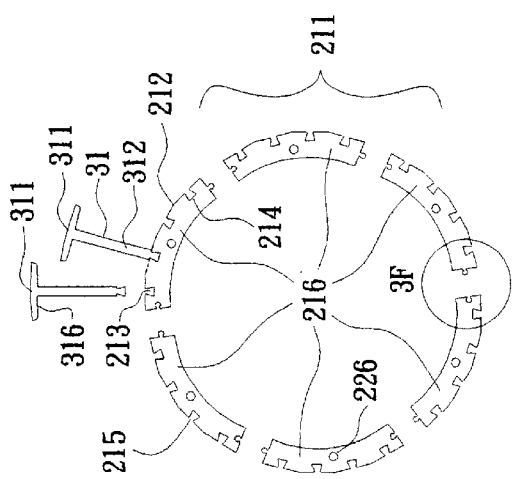
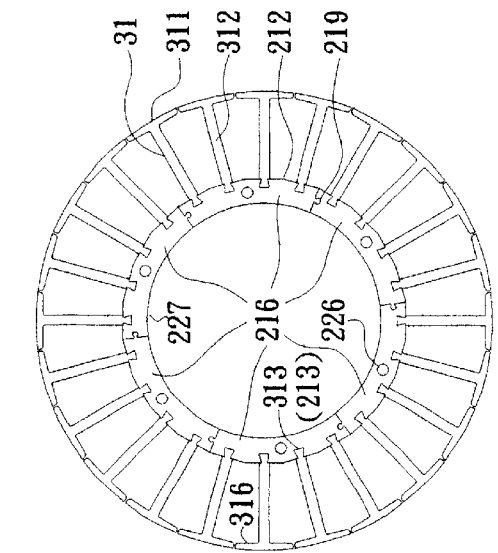

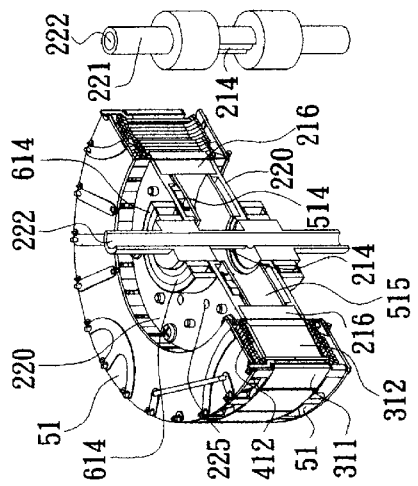
FIG. 9A
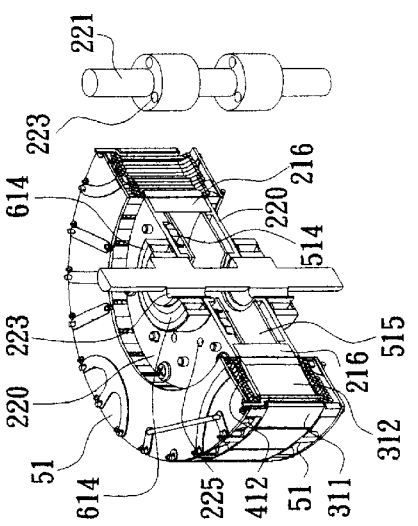
FIG. 9B
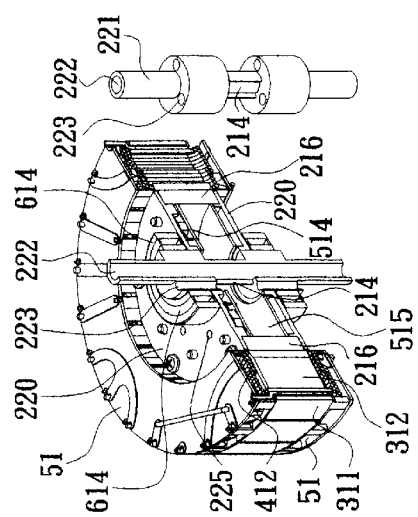
FIG. 9C
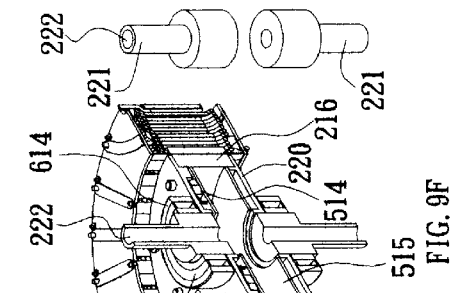
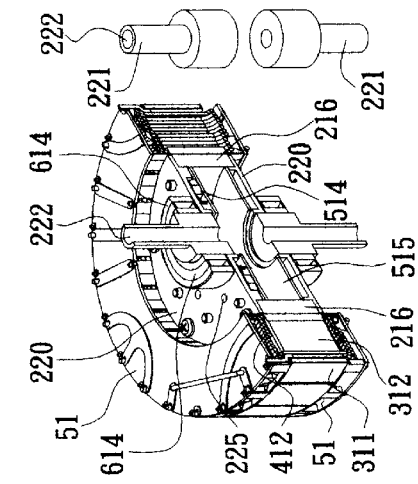
FIG. 9D
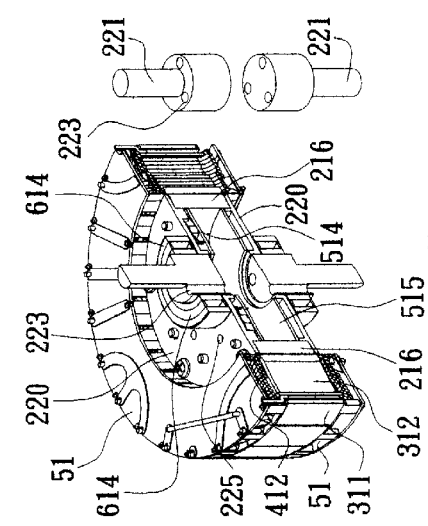
FIG. 9E
FIG. 9F

INNER STATOR OF DRUM TYPE MOTOR

FIELD OF THE INVENTION

The present invention relates to an inner stator of a direct driving drum type motor, in which the conventional inner stator of a drum type motor is exploded into a plurality of units; the winding of the motor coils can be performed with a lower cost and higher manufacturing efficiency. More importantly, the volume occupation and operation efficiency of the motor exciting coils can be improved. Therefore, an inner stator of a direct driving drum type motor of high efficiency, low manufacturing cost, lower manufacturing investment in equipment, and easy installation is achieved.

BACKGROUND OF THE INVENTION

The manufacturing and operation efficiencies of a conventional motor are differently improved. Furthermore, in the prior art, the driving control circuit and motor are manufactured separately. Therefore, the installation, operation and efficiency of a prior art drum type motor are not preferable to the users. The bottleneck of a high efficiency motor is to wind exciting coils since a high efficiency motor needs a respective magnetic load and an electric load. The problem for electrical load is the size of the diameter of the stator exciting coil. A higher electric load represents a higher exciting current.

To have a high exciting current needs an exciting coil with a larger diameter. Another, if it is desired to increase the exciting current of a motor, the diameter of the exciting coil must be further increased. Therefore, the volume occupation of a high wire groove exciting coil must be incremented. An optimum method for this is to use a linear winding. The opening of the stator wire groove must leave with a winding channel of 2 m/m for being used by a winding machine of an inner winding guide pin in CNC operation so that an inner winding guiding pin may pass through the opening of a stator teeth so as to accomplish a linear arrangement. The line opening must leave with a winding guide pin channel and therefore, the winding space of the wire groove must be reduced. That is, the volume occupation of a linear arranged wire groove increases.

A new method is disclosed for improving this phenomenon, in which in a iron core of the stator, it is cut from the center of a wire groove to cause the cut portion has a bendable connection structure so that the stator is arranged linearly and thus, each opening of the wire groove is opened greatly. In the aforesaid way, since the tooth end of the wire groove is wider than that of the tooth root, the insulating seat can not be inserted into the root end after being wound. A horizontal synchronous winding with CNC device is performed, so that the winding engineering of exciting coils are performed. Therefore, after the stator is assembled, a higher volume occupation of coils is achieved.

The aforesaid two winding ways have the same feature of using a CNC device. The exciting wires pass out of the through holes of winding guide pin and then are wound through a CNC device. In summary, the aforesaid prior art has the following problems:

1. Because using a high accuracy CNC operation, the accuracy and cost of the fixture must be improved.
2. Because using a high accuracy CNC operation, the quality of the operators must be improved, and thus, the training of the operators is complex and the salary thereof is increased.
3. The diameter of the winding must be confined by the machine, and thus the cost in machine is increased.
4. The winding speed of the winding guide pin mechanically controlled is too slow (60 to 800 rpm), and thus the production efficiency is too low.
5. The CNC winding device needs very high investment, and therefore, the manufacturing cost of motors is also incremented.

SUMMARY OF THE INVENTION

In the winding engineering in the prior art motor, if the winding is arranged linearly, more space is occupied, and the motor operates effectively, while the whole cost is too high. Another, the production in winding is very low so that the cost of each motor is increased. This is not suitable in mass production. In the inner stator of a drum type motor of the present invention, the guide pins in a CNC machine operation for arranging linearly winding exciting coil used in the prior art is not used so that the cost in the winding machine is reduced and the production efficiency is increased. In the inner stator of a drum type motor of the present invention, the root ends of the stator wire grooves are separated from the outer ring of the inner stator with an equal angle, while the width of the separate distal end is not large than the root end. A pair of correspondent jointing ends are formed at the distal end and the outer ring. Therefore, the insulating wire seat of the inner stator root ends can be formed in advance. The winding is performed by a roller type winding machine so that the cost is low and production efficiency is high. Moreover, the winding machine of the winding transformers can wind exciting coils on an insulating wire seat in a high rotary speed by a coaxial multiple winding way. This means that the winding efficiency can be greatly increased. In the whole, in the present invention, the technology for manufacturing a transformer by a coaxial multiple winding way can be used in the present invention. Moreover, a drum type outer rotor motor with a high operation efficiency and high mechanical strength can be manufactured in the present invention.

To achieve the aforesaid object, the present invention provides an inner stator 10 of a directly driving drum type motor, wherein a conventional inner stator punched by silicon steel piece is exploded into an inner stator ring 211 with a plurality of inlaying groove, inner stator teeth 31 and exciting coil wire seats 41. The wire seat 41 is wound by a respective exciting coil 412 and then is engaged with a stator teeth 31, which is correspondent to the outer ring 212 of the inner stator ring 211 with respect to the plurality of inner stator ring unit 216. The guide pin 419 of the wire seat 41 is positioned and combined with the upper and lower exciting coil retaining plate 51, and the wire head and tail 421 of the coil is welded to the upper and lower retaining plates 51 so as to be serially connected as a complete exciting coil.

The various objects and advantages of the present invention will be more readily understood from the following detailed description when reading in conjunction with the appended drawing.

BRIEF DESCRIPTION OF THE DRAWINGS

FIGS. 1A to 1E are assembled schematic views of a prior art drum type outer rotor motor.

FIGS. 3A to 3G are a plane schematic view of each inner stator in the present invention.

FIGS. 9A to 9F is a schematic cross sectional view of various bidirectional supporting shafts of the present invention.

DETAILED DESCRIPTION OF THE PREFERRED EMBODIMENTS

Figure 2A:
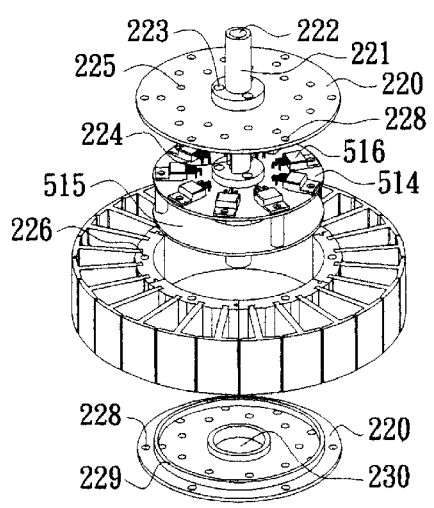
FIGS. 2A to 2D are assembled schematic views of a drum type outer rotor motor in the second embodiment of the present invention.
Figure 2B:
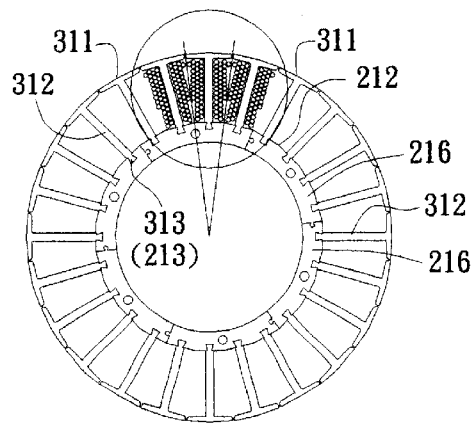
Figure 2D:
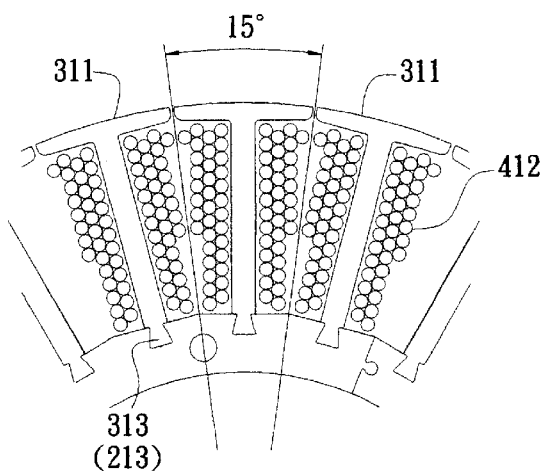
Figure 2C:
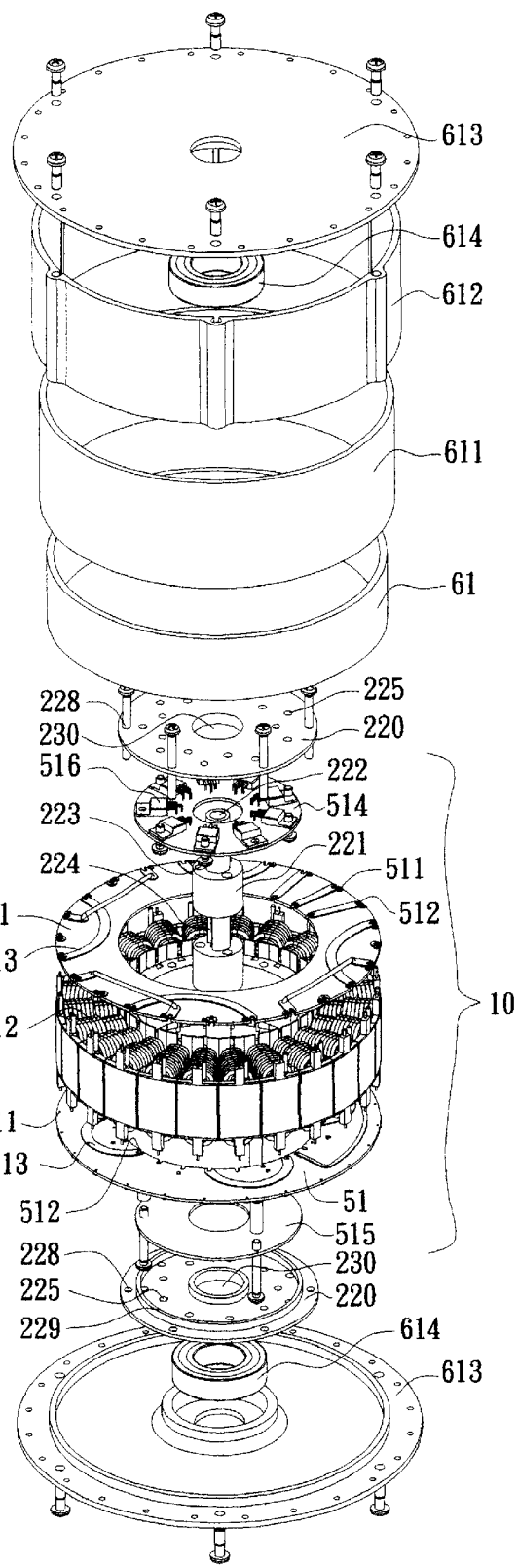

With reference to FIGS. 1A to 2E, the drum type outer rotor motor includes an outer rotor magnet 61, a magnet yoke coil 611, an outer cover plate 612, a casing cover plate 613, a bearing 614, an inner stator 71, a shaft piece 711, etc. Referring to FIGS. 2A to 10F, the inner stator 10 of the drum type outer rotor motor in the present invention includes the following component. An inner stator ring portion 211 (see FIGS. 3A and 3B) is made of permeability silicon steel and is formed through punching and overlapping. The outer ring 212 is divided into a plurality of inlaying grooves each spaced with an equal angle along a circumference of the inner ring and concave toward the inner ring 227. The width of the inner groove 214 of the inlaying groove 213 must be larger than the width of the opening 215 of the inlaying groove 213. The inner ring 227 is formed with a hollow space for positioning a driving control circuit therein. The periphery of the ring portion is installed with a plurality of penetrated positioning holes 226 for positioning and assembly.

With reference to FIGS. 3A to 3E and FIGS. 6A to 6G, a plurality of stator teeth 31 having round arc end surface 311 is installed, which is made of permeability silicon steel and through punching and overlapping. The arc tooth end surface 311 is correspondent to the circumference of the outer rotor with a determined air gap therein. The distal end of the tooth root 312 is extended with a distal end 313. The inner end of the distal end 313 has a width smaller than that of the outer end 315 of the distal end 313 and has a shape correspondent to the inlaying groove 213 of the outer ring 212. The maximum width of the outer end 315 of the distal end 213 is not larger than the width of the root end 312.

Referring to FIGS. 4A to 4F, 5, 6A to 6G, there is a plurality of I shape insulating wire seat and a longitudinally vertical post 411 thereof serves for winding wires so as to be formed as an exciting coil 412. The inner hollow space in the vertical post 411 provides wire seat hollow end 413 for engaging with the root end 312 of the stator tooth 31 and for engaging and releasing from the stator tooth 31. Tow end surfaces 414 and 415 are transversally installed at the front end rear end. The front end surface 414 provides to be jointed with the rear surface of an arc tooth end surface 311 after engaging with the stator tooth. The rear end surface 415 provides to resist against the outer ring 212 of the inner stator ring portion 211. The upper and the lower ends 416, 417 of the front end surface 414 are installed with guide holes 418 and for engaging guide pins 419 to be protruded therefrom.

Figure 7:
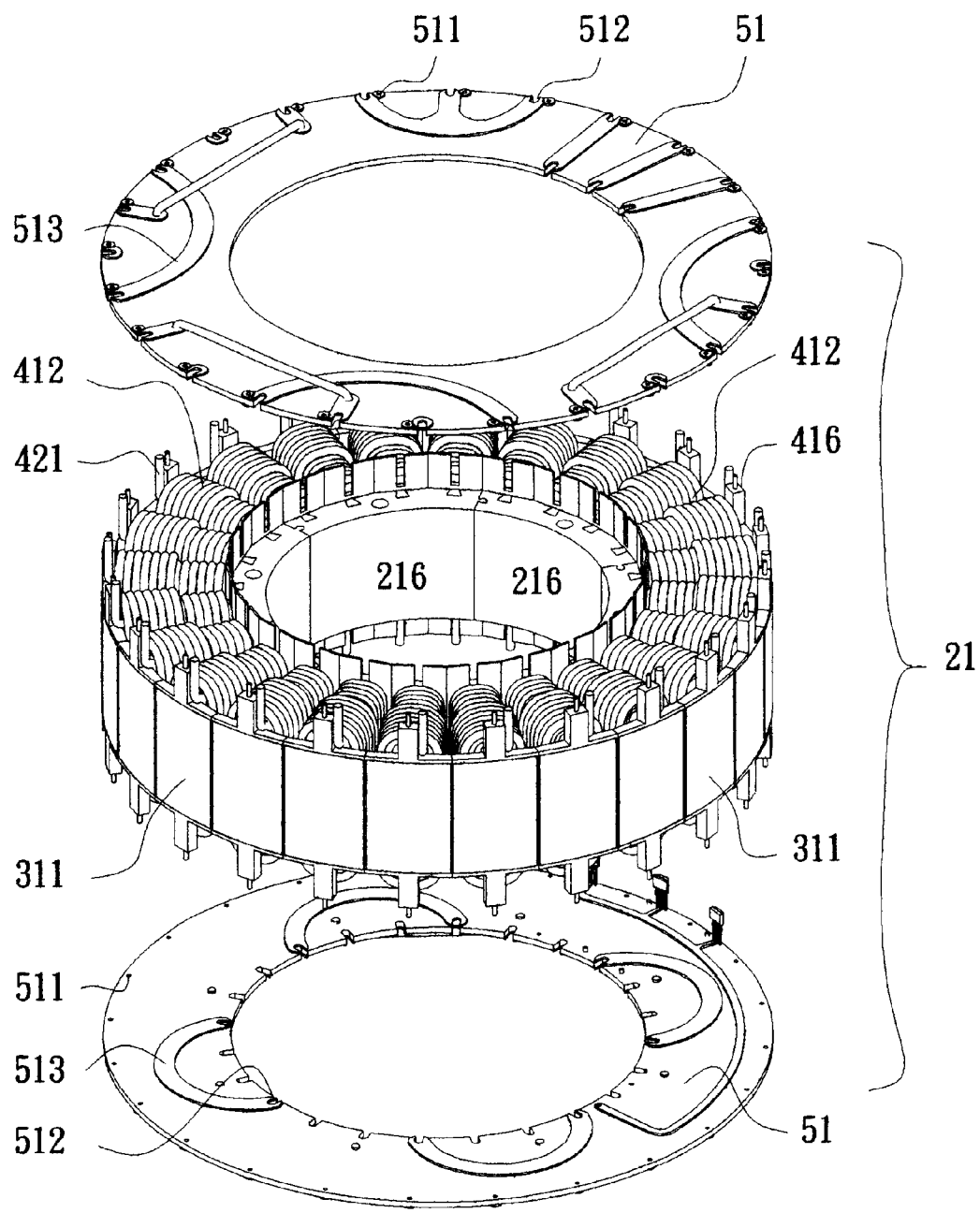
FIG. 7 is an assembled schematic view of the upper and lower circuit boards of the inner stator in the second of the present invention.
Figures 8A, 8B:
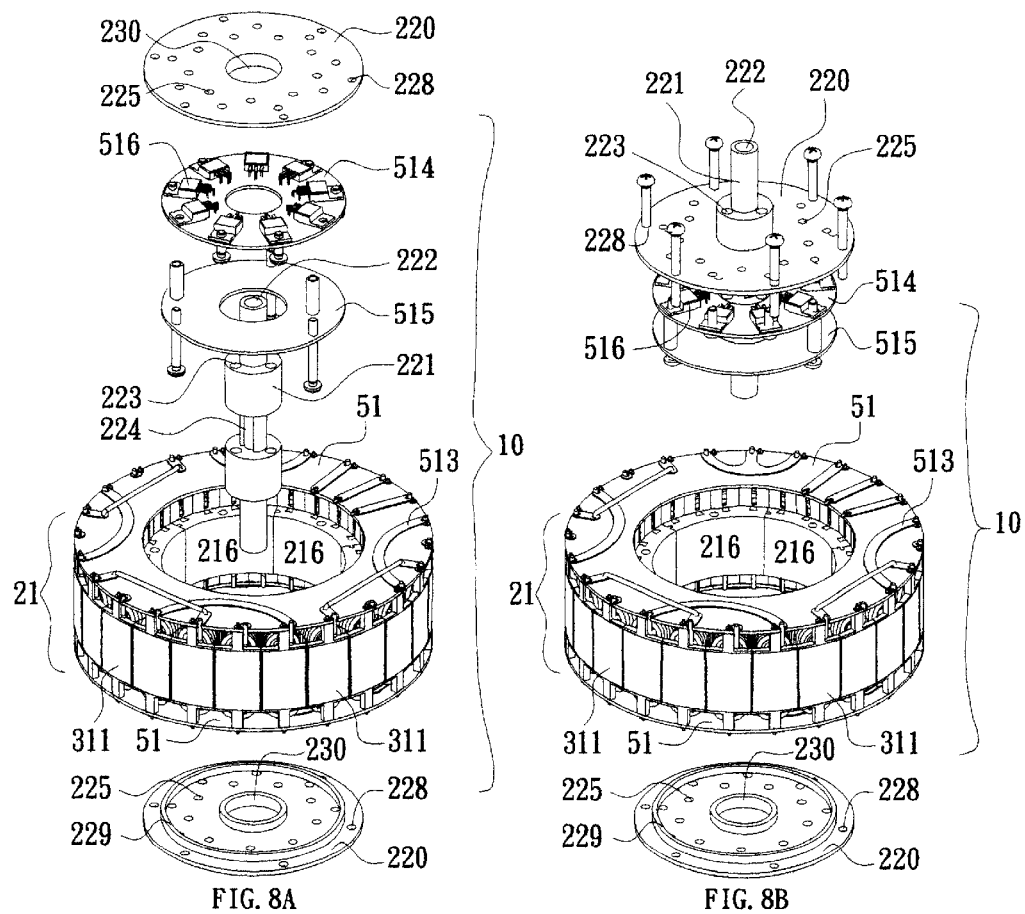
FIGS. 8A to 8C is an assembled schematic view of the second embodiment in the present invention with a driving control circuit hidden therein.
Figure 8C:
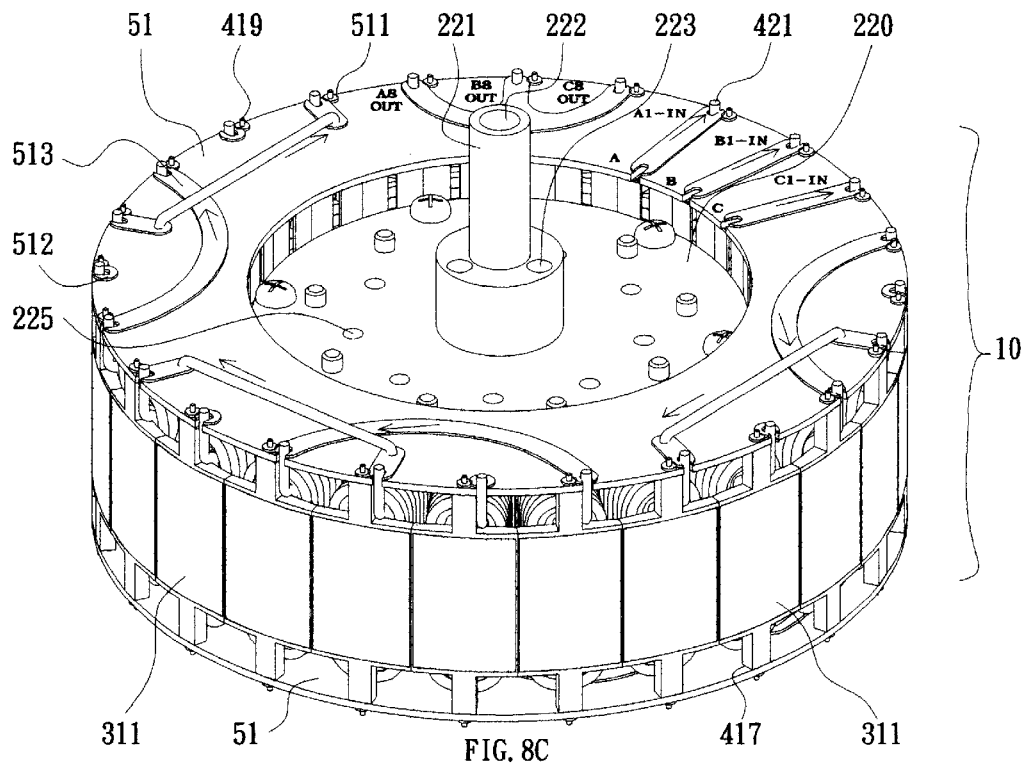
Figure 10A:
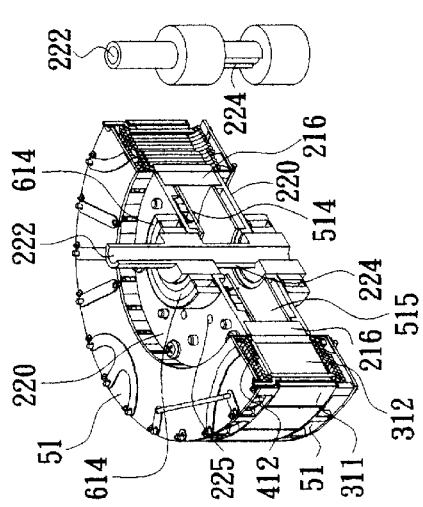
FIGS. 10A to 10F are schematic cross sectional view of various unidirectional supporting shafts in the present invention.
Figure 10B:
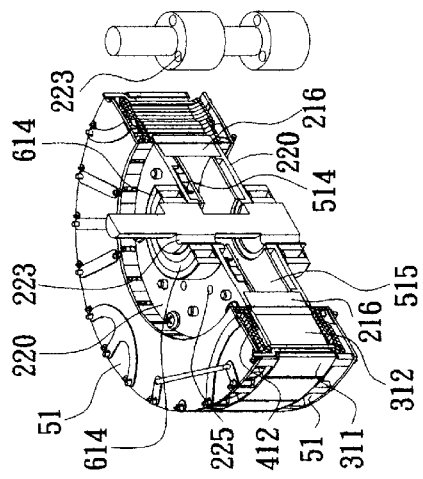
Figure 10C:
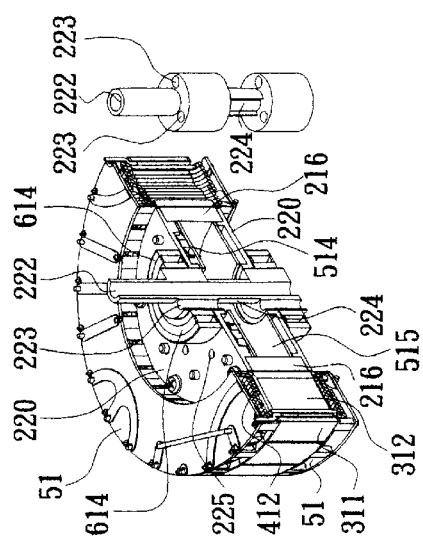
Figure 10D:
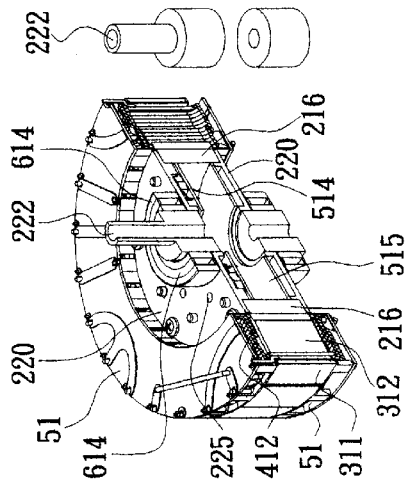
Figure 10E:
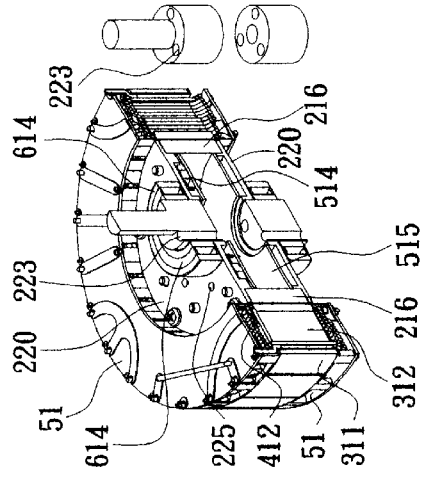
Figure 10F:
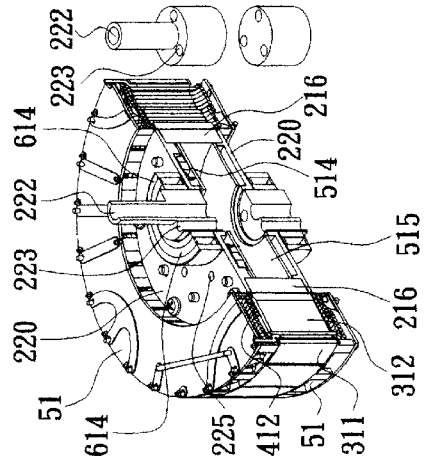

As shown in FIG. 7, the exciting coil retaining plate 51 is a copper foil. The place near an out edge is installed with retaining hole 511 for being passed through by a plurality of guide pins 419 at the upper and lower ends of the wire seat. The retaining plate 51 provides a plurality of copper through holes 512. The wire heads and wire tails 421 wound around the plurality of wire seat 41 may pass through the holes. The copper foil 513 of the retaining plate 51 and conductive wire are serially connected as a complete motor stator exciting coil loop.

As shown in FIGS. 7, 8A to 8C, 9A to 9F, the stator ring cover plate 220 is a metal plate. Near the outer edge is correspondent to the inner ring 227 of the inner stator ring 211 so as to be formed as a flange 229 and then covers on the upper and lower end surfaces of the stator ring 211. The outer circumference of the flange 229 is installed with a plurality of end cover plate retaining holes 228 with respect to the inner ring 227 of the inner stator ring 211. The retaining holes 228 of the upper and lower end cover plates pass through respective retaining holes 226 of the inner stator ring 211 to clamp the inner stator ring 211 to be formed as a hollow space for receiving driving control circuit boards 514, 515. The inner circumference of the flange 229 is installed with a plurality of end cover plate through holes 225 for fixing the driving control circuit boards 514 and 515 and for being passed through and conductive by signals between the exciting coil retaining plate 51 and the driving control circuit boards 514, and 515. The center of the two end cover plates 220 with respect to the motor rotor and thus a concentric hole 230, so that the supporting shaft 221 of the drum type motor may be tightly engaged therein.

Referring to FIGS. 8A to 8C, 9A to 9F, the supporting shaft 221 of the drum type motor is tightly engaged in the hole 221 of the end cover plate 220 to be protruded from the casing cover plate 613 of the drum type motor for fixing and supporting the drum type motor. The axial center and lateral side of the axis are installed with at least one through holes 222, 223, and 224. Therefore, the driving control signals in the inner stator ring 221 may pass therethrough for communicating the inner and outer control signals of the motor. Referring to FIGS. 9A to 9F, the inner diameter of the inner diameter of the bearing 614 are resisted against the two sides of the supporting shaft 221. The outer diameter of the bearing 614 resists against the outer rotor. Thereby, the outer rotor portion is correspondent to the bearing 614 so as to support the supporting shaft 221 to rotate.

The inner stator portion 10 of the direct driving drum type outer rotor motor is illustrated in FIGS. 3A to 3G and 6A to 6G. The inner stator ring 211 can be exploded into a plurality of equal unit parts 216. The left and right ends of each unit 216 are formed with respect to the right and left ends of the adjacent unit 216 through the embedding ends 217, 218, as that illustrated in 219. Therefore, a complete inner stator ring 211 with fixing angle and retaining combination is formed.

The directly driving drum type motor of the present invention has an inner stator 10 which can be exploded into a plurality of equal units 216. The left and right ends of each unit 216 are formed with respect to the right and left ends of the adjacent unit 216 through the embedding ends 217, 218. Therefore, a complete separable inner stator ring 211 with fixing angle is formed.

As shown in FIG. 3E, the directly driving drum type motor of the present invention has an inner stator 10. The inner stator ring 211 and the stator tooth 31 are formed integrally. The space of the wire groove processed by insulation serves to be wound by wires.

Figure 4C:
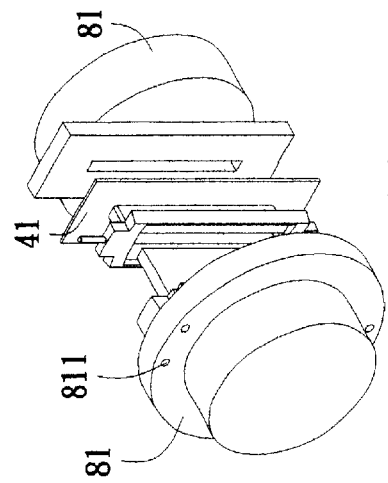
FIGS. 4A to 4F are a schematic view for manufacturing a roller type winding.
Figure 4B:
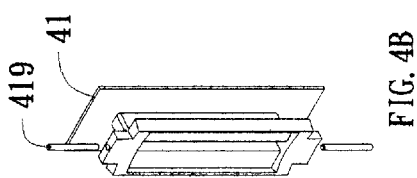
Figure 4A:
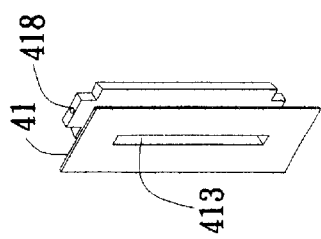
Figure 4F:
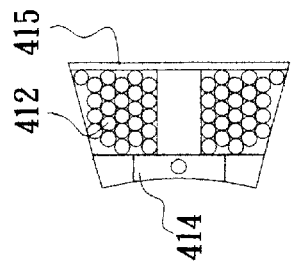
Figure 4E:
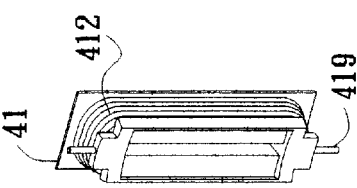
Figure 4D:
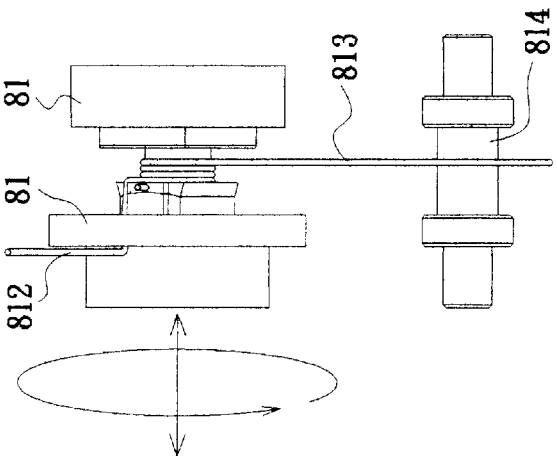
Figure 5:
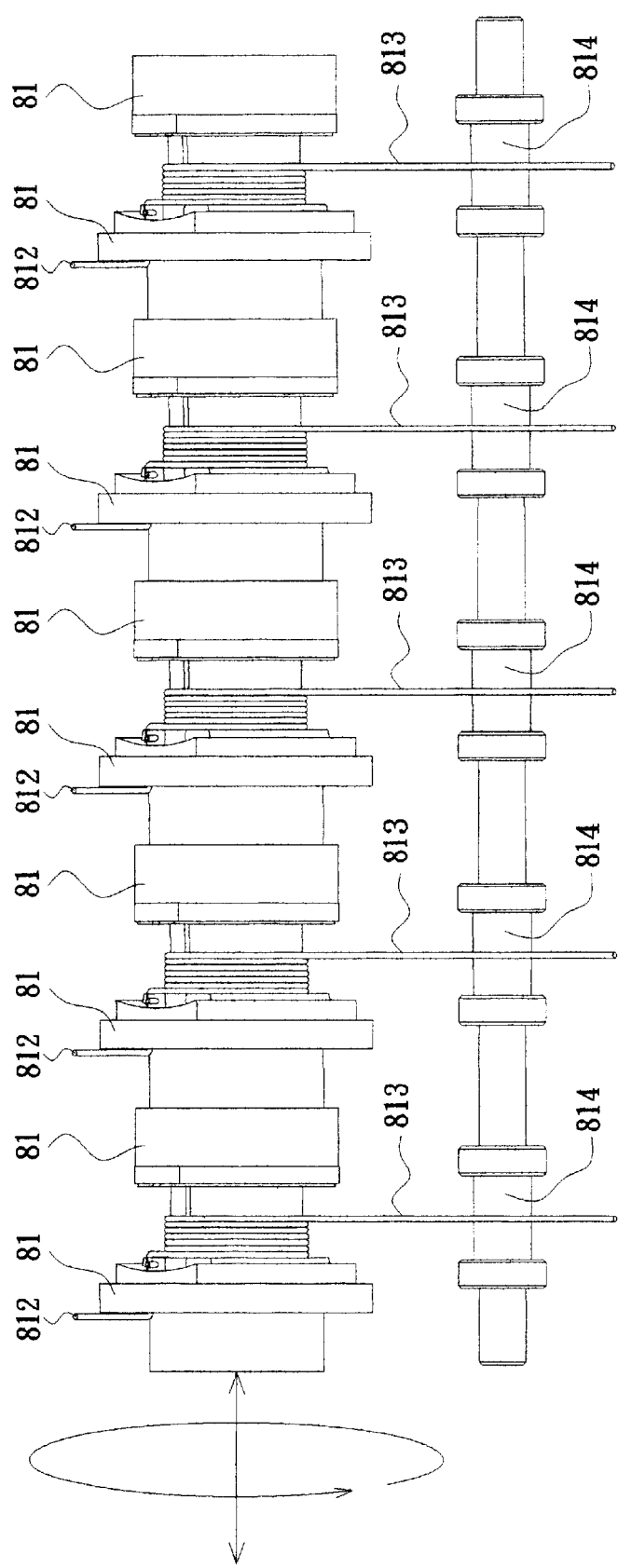
FIG. 5 is a schematic view for manufacturing a coaxial multiple roller winding.
Figure 6A:
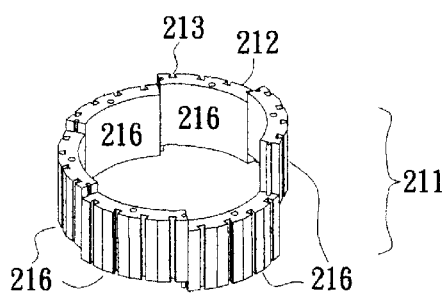
FIGS. 6A to 6G is an assembled schematic view showing the inner stator of the second embodiment in the present invention.
Figure 6B:
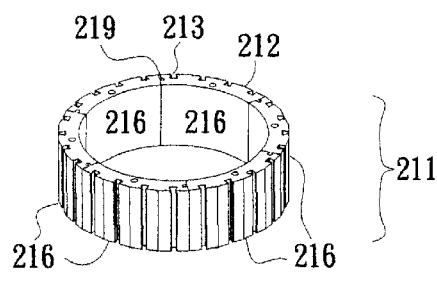
Figure 6C:
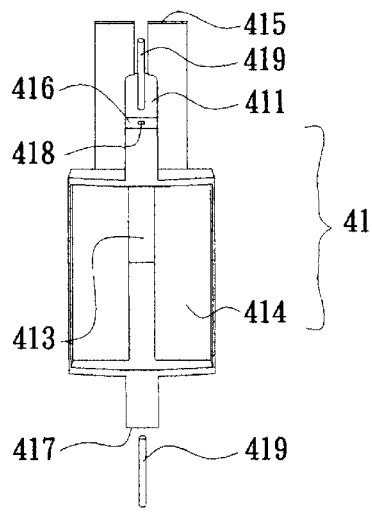
Figure 6D:
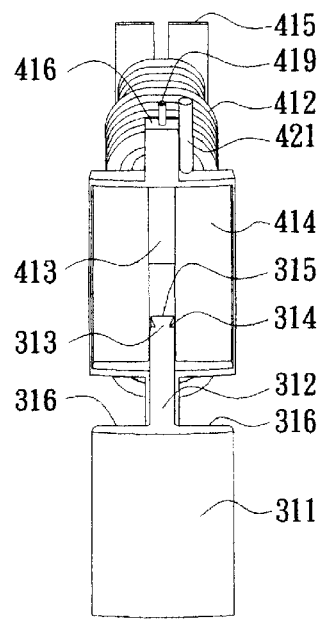
Figure 6E:
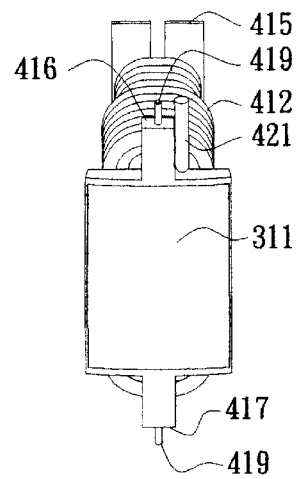
Figure 6F:
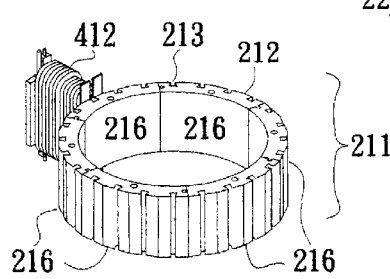
Figure 6G:
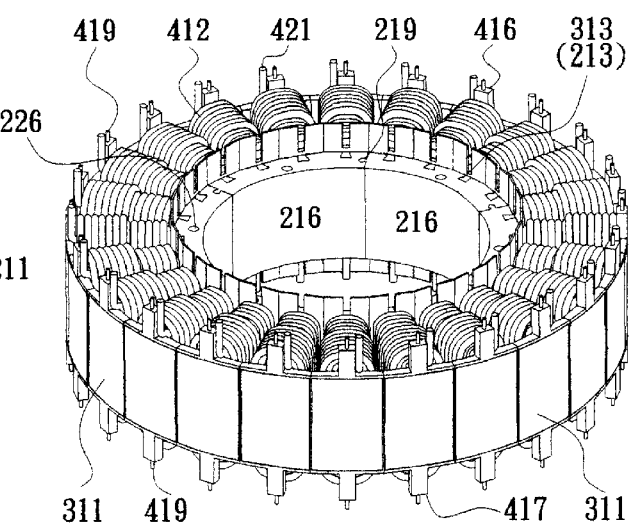

The directly driving drum type motor of the present invention has an inner stator 10, wherein the I shape tooth wire seat 41 can be divided into two independent bodies 420 (as shown in FIG. 4A). The two must be correspondent to each other and can be combined to be formed as a complete I shape tooth wire seat.

The directly driving drum type motor of the present invention has an inner stator 10, wherein the wire head and wire tail 421 of the exciting coil wound around the I shape tooth portion wire seat are wound and welded to guide pins 419 at the upper and lower ends of the wire seat 41, and then is communicated and welded to a copper wire of the retaining plate 51 through the guide pin 419.

Referring to FIGS. 6A to 6G, the directly driving drum type motor of the present invention has an inner stator 10, wherein wire head and wire tail 421 of the exciting coil wound around the I shape tooth portion wire seat are directly welded to a copper hole 512 of the retaining plate 51, and then is electrically welded to a conductive wire 513 so as to be formed as a complete motor stator exciting coil loop 513.

The directly driving drum type motor of the present invention has an inner stator 10, wherein the exciting coils 412 are wound around the I shape tooth portion wire seat 41 along a straight wire path.

The directly driving drum type motor of the present invention has an inner stator 10, wherein the exciting coil 412 is nonlinearly wound around the I shape tooth portion wire seat 41.

The directly driving drum type motor of the present invention has an inner stator 10, wherein the supporting shaft 221 of the drum type motor only provides one end for retaining (see FIGS. 11A to 11F).

The directly driving drum type motor of the present invention has an inner stator 10, wherein only a part of the driving control circuit is installed in the hollow space in the inner stator ring 211.

The directly driving drum type motor of the present invention has an inner stator 10, wherein no part of the driving control circuit is installed in the hollow space in the inner stator ring 211.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An inner stator of a drum type motor comprising:

an inner stator ring portion being made of permeability silicon steel and being formed through punching and overlapping; an outer ring thereof being divided into a plurality of inlaying grooves each spaced with an equal angle along a circumference of the inner ring and being concave toward the inner ring; a width of an inner groove of the inlaying groove is larger than a width of the opening of the inlaying groove; and a circumference of the ring portion is installed with a plurality of penetrated positioning holes for positioning and assembly;

a plurality of stator teeth having round arc end surface being made of permeability silicon steel and being formed through punching and overlapping; an arc tooth end surface being correspondent to a circumference of the outer rotor with a determined air gap therein; a distal end of the tooth root being extended with a distal end; an inner end of the distal end having a width smaller than that of the outer end of the distal end and having a shape correspondent to the inlaying groove of the outer ring; a maximum width of the outer end of the distal end is not larger than the width of the root end; and a plurality of I shape insulating wire seat; a longitudinally vertical post thereof serving for winding wires so as to be as an exciting coil;

an inner hollow space in the vertical post providing a wire seat hollow end for engaging with the root end of the stator tooth and for engaging and releasing from the stator tooth; an upper and a lower end of the front end surface being installed with guide holes and for engaging guide pins to be protruded therefrom; and an exciting coil retaining plate being installed with retaining holes for being passed through by a plurality of guide pins at upper and lower ends of the wire seat; the retaining plate providing a plurality of copper through holes; the wire heads and wire tails wound around the plurality of wire seat passing through the holes; the copper foil of the retaining plate and conductive wire being serially connected as a complete motor stator exciting coil loop.

2. The inner stator of a directly driving drum type motor as claimed in claim 1, wherein the inner stator ring is exploded into a plurality of equal unit parts; left and right ends of each unit are formed with respect to the right and left ends of the adjacent unit through the embedding ends; but a complete inner stator ring with the units having fixing angle relation and being not separable is formed.

3. The inner stator of a directly driving drum type motor as claimed in claim 1, wherein the inner stator ring is exploded into a plurality of equal unit parts; left and right ends of each unit are formed with respect to the right and left ends of the adjacent unit through the embedding ends; but a complete inner stator ring with the units having fixing angle relation and being separable is formed.

4. The inner stator of a directly driving drum type motor as claimed in claim 1, wherein the I shape tooth wire seat can be divided into two independent bodies; the two independent bodies are correspondent to each other and are combined to be formed as a complete I shape tooth wire seat.

5. The inner stator of a directly driving drum type motor as claimed in claim 1, wherein the wire head and wire tail of the exciting coil wound around the I shape tooth portion wire seat are wound and welded to guide pins at upper and lower ends of the wire seat, and then is communicated and welded to a copper wire of the retaining plate through the guide pin so as to be formed as a complete motor stator exciting coil loop.

6. The inner stator of a directly driving drum type motor as claimed in claim 1, wherein the exciting coils are wound around the I shape tooth portion wire seat along a straight wire path.

7. The inner stator of a directly driving drum type motor as claimed in claim 1, wherein the exciting coils are wound around the I shape tooth portion wire seat along a non-straight wire path.

* * * * *